July 1, 1947.  J. W. CONKLIN  2,423,228

ELECTRIC MOTOR CONTROL SYSTEM

Filed Feb. 24, 1943

Inventor
James W. Conklin
By C. D. Tuska
Attorney

Patented July 1, 1947

2,423,228

UNITED STATES PATENT OFFICE 2,423,228

ELECTRIC MOTOR CONTROL SYSTEM

James W. Conklin, Indianapolis, Ind., assignor to Radio Corporation of America, a corporation of Delaware Application February 24, 1943, Serial No. 476,903

2 Claims. (Cl. 172—278)

This invention relates to remote control systems and more particularly to servo systems of the follow-up type. Such systems ordinarily comprise a control shaft, a driven shaft, means for deriving a control voltage related in some predetermined manner to the difference in the angular positions of said shafts, and a driving motor arranged to respond to said control voltages and operate said driven shaft so as to reduce said difference to zero. The driving motor is ordinarily required to reverse, since the usual servo systems are operated in either direction of rotation. In order to permit operation from A.-C. mains, thereby avoiding the necessity for rectifying the energy for the driving motor, it is desirable to use an alternating current motor. Considerations of economy and convenience make it desirable to use an A.-C. motor of standard design.

Accordingly it is the principal object of this invention to provide an improved method of and means for controlling the direction and speed of rotation of a standard induction motor in response to a control voltage.

Another object is to provide an improved method of and means for deriving control voltages in response to the difference in the angular positions of two shafts.

A further object is to provide an improved servo system employing an induction motor of standard design.

Figure 1:
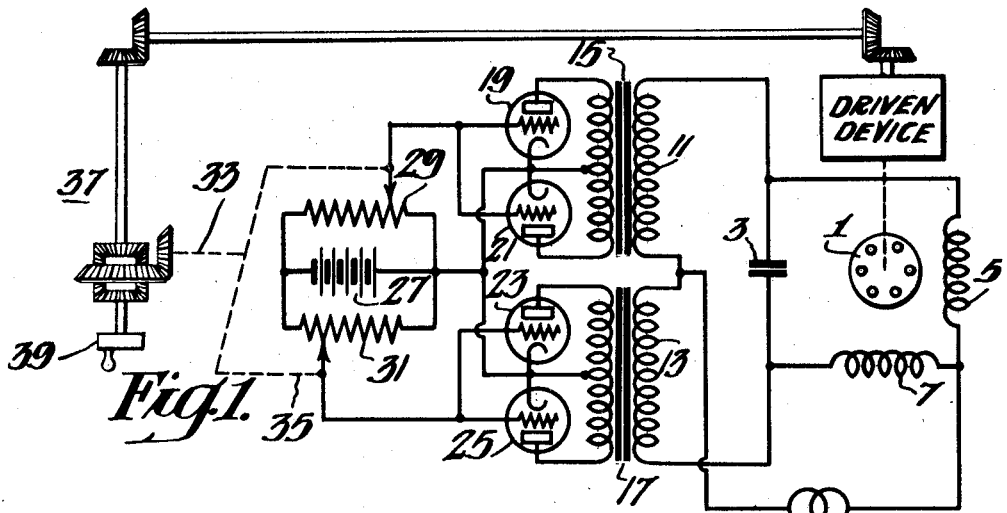
Figure 2:
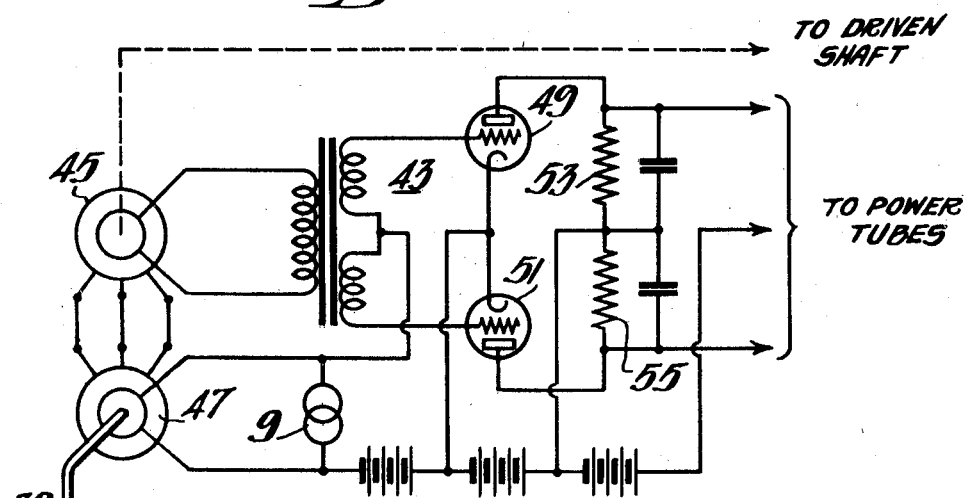
Figure 3:
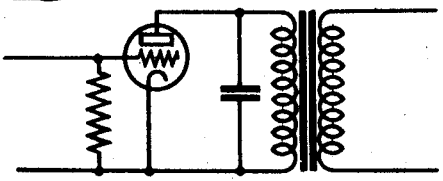

These and other and incidental objects will become apparent to those skilled in the art upon consideration of the following description with reference to the accompanying drawing of which Fig. 1 is a schematic diagram of a control system embodying the present invention, Fig. 2 is a schematic circuit diagram of a modified arrangement for deriving the motor control voltage for the system of Fig. 2, and Fig. 3 is a schematic diagram of a modified impedance control circuit.

Referring to Fig. 1, a standard two phase induction motor 1 is provided with a capacitor 3 connected to the power input windings 5 and 7. The capacitor 3 is of the proper value to provide quadrature relationship between the currents through the windings 5 and 7. The junction point of the windings 5 and 7 is connected to one side of an A.-C. source 9. The other side of the source 9 is connected through the secondaries 11 and 13 respectively of a pair of transformers 15 and 17 to the windings 5 and 7. The primary winding of the transformer 15 is center tapped and a pair of electron discharge tubes 19 and 21 are connected with their anode circuits in push-pull relationship to said secondary. A second pair of tubes 23 and 25 are similarly connected to the primary of the transformer 17. The control grids of the tubes 19 and 21 are connected together and to a source of unidirectional voltage of adjustable magnitude, such as a battery 27 shunted by a potentiometer 29.

The control grids of the tubes 23 and 25 are similarly connected together to a potentiometer 31. The potentiometers 29 and 31 are mechanically connected as indicated by dash lines 33 and 35 to a mechanical linkage 37 which is provided with a control input device, such as a manually operable crank 39. The linkage 37 is arranged to operate the potentiometers 29 and 31 differentially so that as the voltage applied to the control grids to the tubes 19 and 21 is increased, the voltage applied to the grids of the tubes 23 and 25 is correspondingly decreased. The shaft of the motor is mechanically coupled to the driven device and to the linkage 37, which is provided with differential means so that the positions of the potentiometers 29 and 31 are determined by the difference in angular position of the shaft of the driving motor from that of the control member.

The operation of the above described system is as follows:

Voltage from the A.-C. source 9 is applied through the transformer windings 11 and 13 to both sides of the capacitor 3. As long as the impedances presented by the secondaries 11 and 13 are substantially equal and high, (if the associated tubes are adjusted to cut-off), the currents through the motor windings 5 and 7 will be equal and low, and in phase, and the motor will be energized as a single phase induction motor. Since under these conditions there is no starting torque and the motor will remain at a standstill. If the winding 11 is open circuited and the winding 13 is short circuited, which conditions are controlled by the associated tubes 19, 21 and 23, 25 respectively, the currents through the motor windings 5 and 7 will be in quadrature phase with respect to each other, and a relatively large torque will be developed tending to cause the motor to rotate in, for example, a clockwise direction. If the above conditions are reversed, that is the winding 11 is short circuited and the winding 13 is open circuited, counter clockwise torque will be developed.

The secondaries 11 and 13 are designed to have relatively high inductive reactances at the frequency of the supply 9 and are closely coupled to the respective primaries. Thus when the tubes 19 and 21 are cut off, the impedance presented by the winding 11 to the motor circuit is very high and is substantially the equivalent of an open circuit. When the tubes 19 and 21 are biased to conduct, the impedance presented by the secondary 11 is relatively low. This impedance is equal to $Z/n^2$, where $n$ is the turns ratio of the transformer and Z is the dynamic impedance of the tubes 19 and 21. For intermediate values of tube resistance the quadrature relationship of the currents through the motor windings does not obtain, and the torque developed by the motor accordingly assumes correspondingly intermediate values. Thus by operating the potentiometers 29 and 31 in differential relationship the conductivities of the tubes 19 and 21 are varied differentially, controlling the magnitude and direction of the torque developed by the motor 1. The differential connection of the motor shaft to the control linkage produces a follow-up action, causing the potentiometers to be driven to their balanced positions when the output shaft is at an angular position corresponding to that of the control input shaft.

Referring to Fig. 2, the mechanical differential and potentiometer arrangement of Fig. 1 may be replaced by a polarity responsive circuit 43 and a pair of synchro transformers 45 and 47. The circuit 43 comprises a pair of electron discharge tubes 49 and 51 with their anode circuits connected in push-pull relationship to a pair of load resistors 53 and 55. The rotor of the transformer 47 is coupled to the control input shaft, and the rotor of the transformer 45 is coupled to the driven output shaft. The stator windings of the transformers 45 and 47 are connected together. The rotor winding of the transformer 47 is connected to an A.-C. source 9, and the rotor winding of the transformer 45 is coupled to the control grids of the tubes 49 and 51 in push-pull relationship. The A.-C. source 9 is coupled to the grids of the tubes 49 and 51 in parallel relationship.

In operation, the voltage from the source 9 is applied through the cascaded synchro transformers 47 and 45 to the push-pull input circuit of the circuit 43. The amplitude of this voltage depends on the difference in the angular positions of the rotors of the transformers 45 and 47. The polarity of this voltage with respect to that of the source 9 depends upon which of the transformer rotors leads the other. Assuming that the relative positions of the input and output shafts are such that the voltages applied to the grid of the tube 49 through the synchro transformers is positive at the same time as the voltage applied thereto directly from the source 9, the resultant voltage on the grid of the tube 49 will be the sum of said voltages; the resultant applied to the grid of the tube 51 will be the difference of said voltages. The average potential drop across the load resistor 53 will be correspondingly large and that across the resistor 55 will be correspondingly small. Thus as the angular difference between the input and output shafts is varied the output voltages of the detector 43 are differentially varied in a corresponding manner. These voltages may be applied to impedance control circuits of the type described in connection with Fig. 1, providing operation similar to that of the system of Fig. 1.

The impedance control tubes in the system of Fig. 1 are provided with push-pull connected anode circuits in order to provide symmetrical wave form of the voltages applied to the motor 1. A single sided impedance control circuit as illustrated in Fig. 3 may be substituted providing that the wave form requirements are not too critical and the impedance control tubes are biased for class A operation.

Thus the invention has been described as an electrical servo system of the follow-up type, for use with induction motors of standard design. Motor control is achieved by means of electron discharge tubes connected to operate as variable impedances in a phase splitting network. With variation of the tube impedances, the phase relationship between the currents through the motor windings may be varied uniformly from that required to produce maximum torque in one direction to that required to produce maximum torque in the opposite direction. Control voltages for the impedance control tubes may be derived from variable voltage dividers connected across a D.-C. source, or from synchro transformers and a polarity responsive circuit.

I claim as my invention:

1. A motor control system comprising a motor having two windings adapted to cause said motor to rotate in one direction or the other according to the relative phase of the energizing currents in said windings; a phase shifting capacitor having two terminals; a source of single phase alternating current, said windings being connected between one side of said source and the two terminals of said capacitor, respectively; a pair of transformers having their secondaries connected between the other side of said source and the terminals of said capacitor, respectively, each of said transformers having push-pull primary windings; two pairs of thermionic discharge tubes having their plate electrodes connected in push-pull relation with said primary windings, the plate potential for said tubes being solely that induced across said primary windings by currents flowing in said secondary windings, and means for applying a first direct current control potential to the grid electrodes of one of said pairs of tubes and a second direct current control potential to the grid electrodes of the other pair of tubes; and unitary means for varying simultaneously said first and second control potentials in opposite directions whereby to control the speed and direction of rotation of said motor.

2. A motor control system comprising a motor having two windings adapted to cause said motor to rotate in one direction or the other according to the relative phase of the energizing currents in said windings; a phase shifting capacitor having two terminals; a source of single phase alternating current, said windings being connected between one side of said source and the two terminals of said capacitor, respectively; a pair of transformers having their secondaries connected between the other side of said source and the terminals of said capacitor, respectively, each of said transformers having push-pull primary windings; two pairs of thermionic discharge tubes having their plate electrodes connected in push-pull relation with said primary windings, the plate potential for said tubes being solely that induced across said primary windings by currents flowing in said secondary windings, and unitary means for selectively biasing off both tubes of one of said pairs while causing the tubes of the other pair to conduct alternately to cause a full sine wave current of controlled amplitude to flow through one or the other of said secondary windings, whereby the speed and direction of rotation of said motor is controlled.

JAMES W. CONKLIN.

REFERENCES CITED

The following references are of record in the file of this patent:

UNITED STATES PATENTS

| Number | Name | Date |
|---|---|---|
| 714,786 | Day | Dec. 2, 1902 |
| 2,223,666 | Harrison | Dec. 3, 1940 |
| 1,547,435 | Mittag | July 28, 1925 |
| 2,040,014 | Moseley | May 5, 1936 |
| 2,068,490 | Hull | Jan. 19, 1937 |
| 2,194,170 | Newell | Mar. 19, 1940 |
| 1,955,322 | Brown | Apr. 17, 1934 |
| 2,331,934 | Satterlee | Oct. 19, 1943 |
| 1,691,150 | Crisson | Nov. 13, 1928 |
| 1,709,083 | Littlefield | Apr. 16, 1929 |